(12) United States Patent
Shaw et al.

(10) Patent No.: US 7,747,889 B2
(45) Date of Patent: Jun. 29, 2010

(54) BUS HAVING A DYNAMIC TIMING BRIDGE

(75) Inventors: Craig D. Shaw, Austin, TX (US);
Matthew D. Akers, Austin, TX (US);
Robert N. Ehrlich, Leander, TX (US);
Brett W. Murdock, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 896 days.

(21) Appl. No.: 11/461,048

(22) Filed: Jul. 31, 2006

(65) Prior Publication Data
US 2008/0028253 A1    Jan. 31, 2008

(51) Int. Cl.
*G06F 1/00* (2006.01)
*G06F 1/04* (2006.01)
*G06F 1/12* (2006.01)
*H03L 7/00* (2006.01)
*H04L 7/00* (2006.01)
*G06F 13/00* (2006.01)

(52) U.S. Cl. ............... 713/500; 713/401; 713/503; 327/161; 375/355; 710/110; 710/317

(58) Field of Classification Search ............... 713/500, 713/401, 503; 327/161; 375/355; 710/110, 710/317
See application file for complete search history.

(56) References Cited

U.S. PATENT DOCUMENTS

| | | | |
|---|---|---|---|
| 6,345,328 B1 * | 2/2002 | Rozario et al. | 710/52 |
| 6,529,057 B2 * | 3/2003 | Yee | 327/172 |
| 7,154,976 B2 * | 12/2006 | Williams | 375/371 |
| 7,200,197 B2 * | 4/2007 | Goko | 375/372 |
| 7,284,143 B2 * | 10/2007 | Song et al. | 713/503 |
| 7,345,520 B2 * | 3/2008 | Isono | 327/276 |
| 7,363,401 B1 * | 4/2008 | Rajagopalan | 710/60 |
| 7,373,450 B2 * | 5/2008 | Kamegawa | 710/316 |
| 2004/0059446 A1 * | 3/2004 | Goldberg et al. | 700/94 |

* cited by examiner

*Primary Examiner*—Thomas Lee
*Assistant Examiner*—Stefan Stoynov
(74) *Attorney, Agent, or Firm*—Ranjeev Singh; Michael J. Balconi-Lamica

(57) ABSTRACT

A data processing system may comprise an initiator device having an output whose timing is referenced by a clock input alone corresponding to a first delay along a signaling path. The exemplary data processing system further may further comprise a target device having an input whose timing is referenced by a clock input alone corresponding to a second delay along the signaling path and a system bus interconnected between the initiator device and the target device within the signaling path. The exemplary data processing system may further comprise a dynamic timing bridge coupled to the system bus within the signaling path, wherein responsive to a control signal representative of at least one system characteristic, the dynamic timing bridge performs one selected from the group consisting of (i) inserting a cyclic latency within the signaling path and (ii) not inserting the cyclic latency within the signaling path.

18 Claims, 4 Drawing Sheets

BUS HAVING A DYNAMIC TIMING BRIDGE

BACKGROUND OF THE INVENTION

1. Field of the Invention

This invention relates in general to a data processing system and more specifically to a system bus having a dynamic timing bridge and a method therefor.

2. Description of the Related Art

In a data processing system having a processor, which may act as a master device, and a memory, which may act as a slave device, timing adjustments may need to be made to the system bus to ensure compliance with timing requirements, such as setup time. By way of example, in certain data processing systems, the master device and the slave device may be connected by a bus. For the slave device to reliably sample data on the bus, the data signal needs to be held steady for a certain minimum time before the data is sampled by the slave device. This time is generally referred to as the setup time.

Conventionally, timing requirements have been addressed at the design stage using static register slices. In particular, a register slice may be used to correct a defective timing path by inserting a cyclic delay and thereby producing an equivalent two-clock-cycle timing path instead of a one-clock-cycle timing path. After the design stage, the designer's choices corresponding to inclusion or exclusion of the register slices are permanent. While these permanent changes work well with the worst-case operating mode, they are less optimal in operating modes that allow more relaxed timing. In particular, because of the permanence of the register slice, each transaction on the bus corresponding to the data processing system would suffer an extra cycle of latency regardless of the need for it.

Thus, there is a need for a system bus having a dynamic timing bridge and a method therefor.

BRIEF DESCRIPTION OF THE DRAWINGS

The present invention may be better understood, and its numerous objects, features, and advantages made apparent to those skilled in the art by referencing the accompanying drawings.

Figure 1:
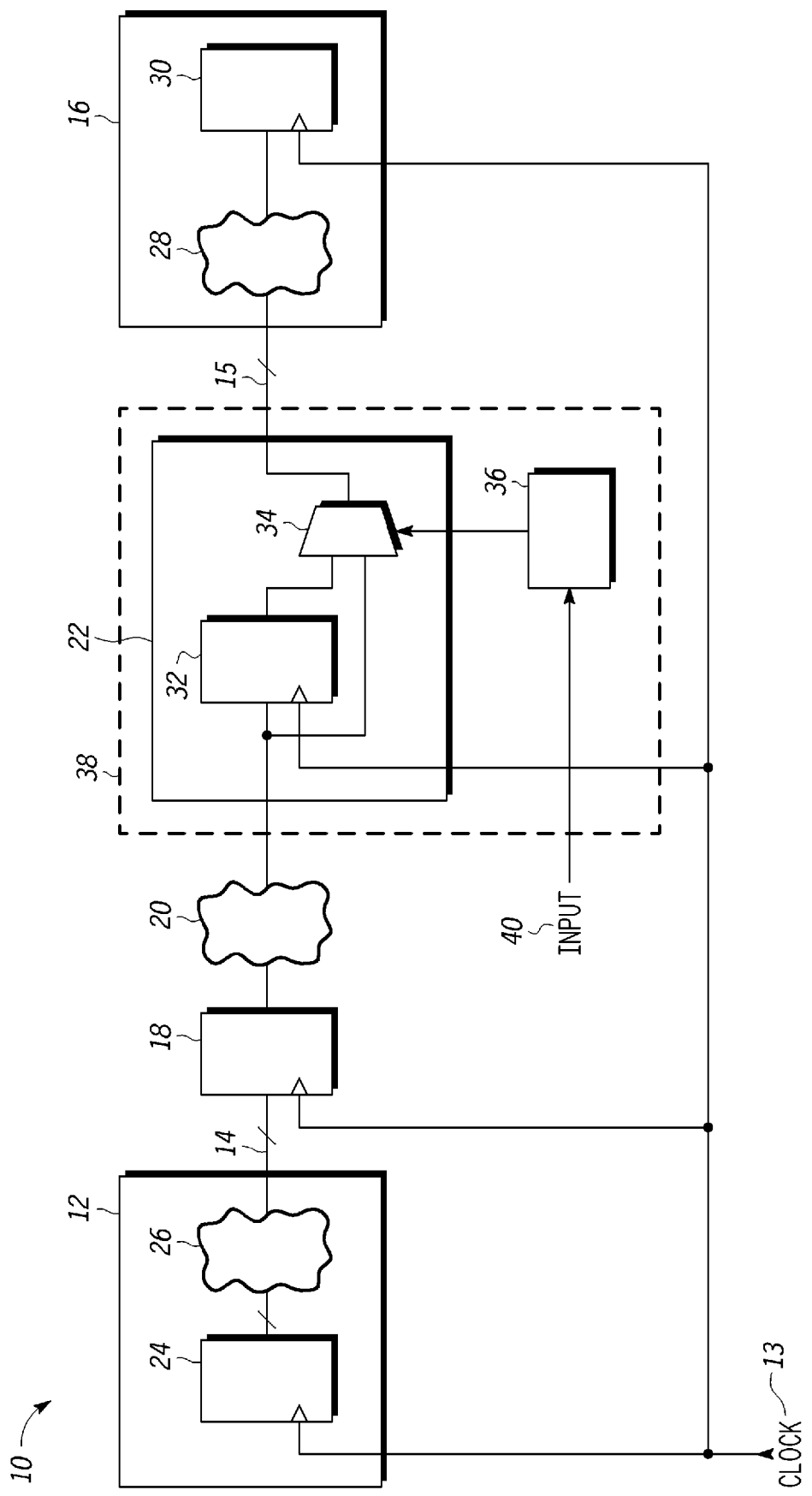
FIG. 1 shows a diagram of an exemplary data processing system having a system bus with a dynamic timing bridge, consistent with one embodiment of the invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The following sets forth a detailed description of a mode for carrying out the invention. The description is intended to be illustrative of the invention and should not be taken to be limiting.

In one aspect, a data processing system may comprise an initiator device having an output whose timing is referenced by a clock input alone corresponding to a first delay along a signaling path. The exemplary data processing system further may further comprise a target device having an input whose timing is referenced by a clock input alone corresponding to a second delay along the signaling path and a system bus interconnected between the initiator device and the target device within the signaling path. The exemplary data processing system may further comprise a dynamic timing bridge coupled to the system bus within the signaling path, wherein responsive to a control signal representative of at least one system characteristic, the dynamic timing bridge performs one selected from the group consisting of (i) inserting a cyclic latency within the signaling path and (ii) not inserting the cyclic latency within the signaling path.

In another aspect, a data processing system may comprise an initiator device having an output whose timing is referenced by a clock input alone corresponding to a first delay along a signaling path. The data processing system may further comprise a target device having an input whose timing is referenced by a clock input alone corresponding to a second delay along the signaling path and a system bus interconnected between the initiator device and the target device within the signaling path. The data processing system may further comprise a dynamic timing bridge coupled to the system bus within the signaling path, wherein responsive to a control signal representative of at least one system characteristic, the dynamic timing bridge performs one selected from the group consisting of (i) inserting a cyclic latency within the signaling path and (ii) not inserting the cyclic latency within the signaling path, wherein the dynamic timing bridge (i) inserts the cyclic latency within the signaling path in response to conditions wherein a desired system operating frequency cannot be met in the absence of the dynamic timing bridge cyclic latency and (ii) does not insert the cyclic latency within the signaling path in response to the system operating under conditions that allow the desired system operating frequency to be met without the presence of the dynamic timing bridge cyclic latency, and wherein the at least one system characteristic includes an operating condition based upon one or more selected from the group consisting of process, voltage, temperature, and frequency.

In yet another aspect, a method of dynamic bypass control may comprise providing an initiator device having an output whose timing is referenced by a clock input alone corresponding to a first delay along a signaling path. The method may further comprise providing a target device having an input whose timing is referenced by a clock input alone corresponding to a second delay along the signaling path. The method may further comprise interconnecting a system bus between the initiator device and the target device within the signaling path. The method may further comprise coupling a dynamic timing bridge to the system bus within the signaling path, wherein responsive to a control signal representative of at least one system characteristic, the dynamic timing bridge performs one selected from the group consisting of (i) inserting a cyclic latency within the signaling path and (ii) not inserting the cyclic latency within the signaling path.

As shown in FIG. 1, an exemplary data processing system 10 may include a bus 14 connecting an initiator device 12 to a target device 16. Bus 14 may be any system bus, such as an AXI bus, an Amba High-Speed (AHB) bus, or any other suitable system bus. Bus 14 may comprise of at least one signal line and may carry at least one signal. Alternatively, bus 14 may carry a plurality of data, address, control, or other signals. Devices connected to bus 14 may be clocked using at least one clock, such as clock 13. Initiator device 12 may be any device having an output referenced to a clock input, such that the clock input alone determines timing of the output. Exemplary initiator devices include a processor, a co-processor, a processor core, a memory-management-unit, or any other control or data processing unit that may generate a clocked output. Initiator device 12 may include a sequential logic block 24 and a combinational logic block 26. Sequential logic block 24 may include one or more sequential logic elements, such as flip-flops. Sequential logic block 24 may be clocked using clock 13 or a clock derived from clock 13. Combinational logic block 26 may include one or more combinational logic elements, such as logic gates. Target device 16 may be any device having an input referenced to a clock input, such that the clock input alone determines the timing of the input. Exemplary target devices include a co-processor, a memory, or any other suitable device that may receive a clocked input. Target device 16 may include a combinational logic block 28 and a sequential logic block 30. Combinational logic block 28 may include one or more combinational logic elements, such as logic gates. Sequential logic block 30 may include one or more sequential logic elements, such as flip-flops. Sequential logic block 24 may be clocked using clock 13 or a clock derived from clock 13. Although FIG. 1 shows only one initiator device 12 and one target device 16, data processing system 10 may include additional initiator devices and may further include additional target devices. Further, by way of example, initiator device 12 may act as a master and target device 16 may act as a slave in a master-slave configuration.

Referring still to FIG. 1, data processing system 10 may further include a static timing bridge 18 and a system-level interconnect 20. Data processing system 10 may further include a dynamic timing bridge 22. Dynamic timing bridge 22 may be dynamically inserted or removed from a timing path based on a control input. As used herein the term dynamic includes the ability to insert or remove the timing bridge post-design and implementation of the system. In particular, dynamic timing bridge 22 may introduce at least one cycle delay in a signaling path during operation of data processing system 10. By way of example, dynamic timing bridge 22 may include a sequential logic block 32 and a multiplexer 34. Multiplexer 34 may be controlled via a control input. Control input may be received from a controller 36, which may comprise a part of a dynamic timing bridge and control element 38. Controller 36 may be implemented in several ways. By way of example, controller 36 may be a programmable register bit that may be set by the operating system in response to a user input, an evaluation of certain operating conditions, or any other criteria. Alternatively, controller 36 may be implemented as process, voltage, temperature, or frequency sensing (PVTf) circuit. Thus, controller 36 may detect a change in any of these variables and generate a control input for dynamic timing bridge 22. Alternatively, controller 36 may be any type of hardware or software control that generates a control input for dynamic timing bridge 22. In general, dynamic timing bridge may include a bus input, a clock input, a control signal input, and an output, and may further comprise a sequential logic block and a multiplexer. The bus input may be coupled to (i) an input of the sequential logic block 32 and (ii) an input of the multiplexer 34. The clock input may be coupled to a clock input of the sequential logic block 32, and an output of the sequential logic block 32 may coupled to another input of the multiplexer 34. The control signal input may be coupled to a select input of the multiplexer 34, and an output of the multiplexer 34 may be coupled to the output of the dynamic timing bridge 22, such that responsive to the control signal input, the multiplexer 34 may multiplex one of the bus input or the sequential logic block output onto the dynamic timing bridge output.

Figure 2:
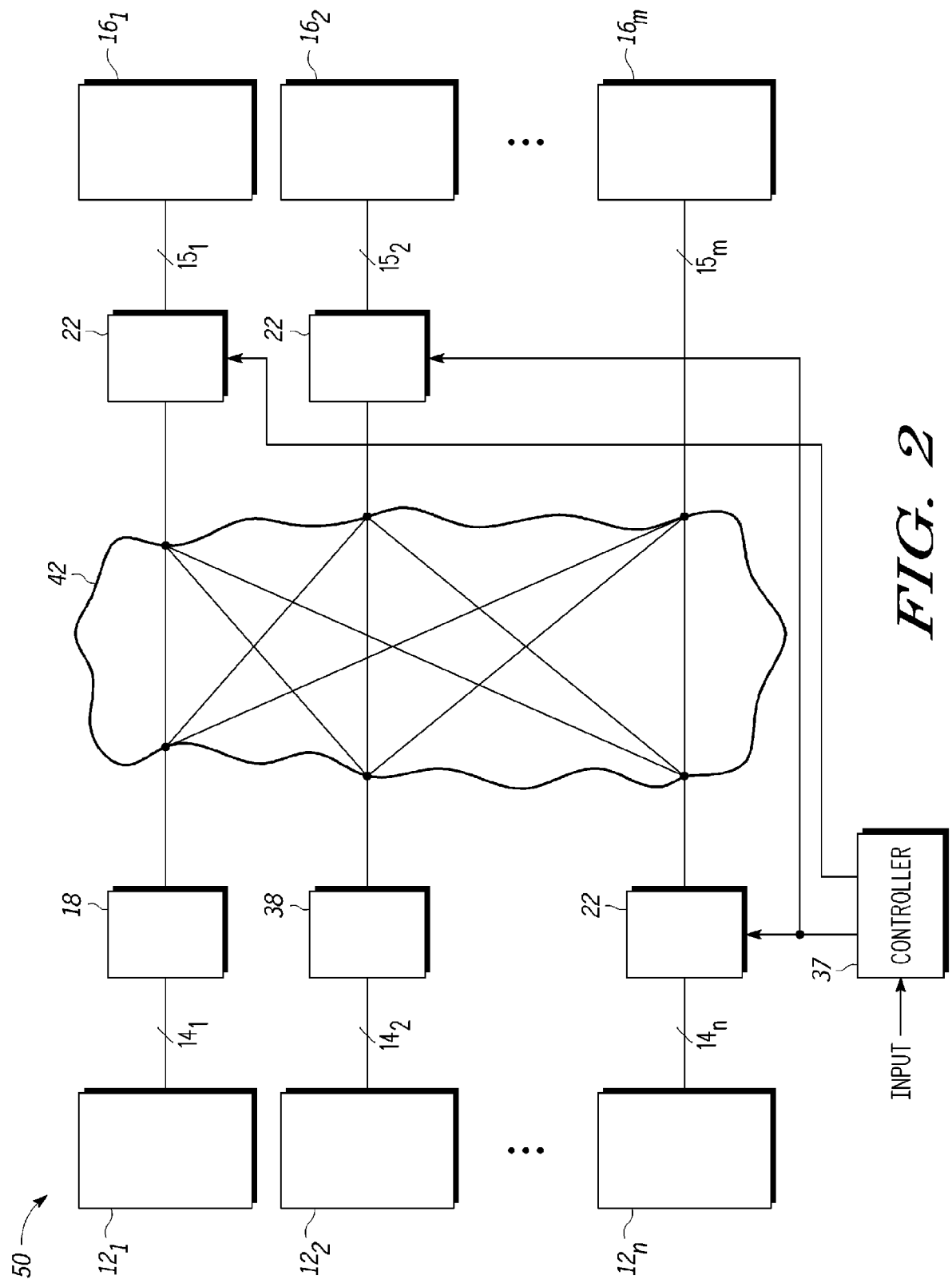
FIG. 2 shows a diagram of another exemplary data processing system having system buses with dynamic timing bridges, consistent with one embodiment of the invention.

FIG. 2 shows a diagram of another exemplary data processing system 50 having system buses with dynamic timing bridges, consistent with one embodiment of the invention. Data processing system 50 may include buses $14_1$, $14_2$, and $14_n$ connecting initiator devices $12_1$, $12_2$, and $12_n$ to a system interconnect 42. System interconnect 42 may be any combination of sequential logic and combination logic. Data processing system 50 may further include buses $15_1$, $15_2$, and $15_m$ connecting target devices $16_1$, $16_2$, and $16_m$ to system interconnect 42. A static timing bridge 18 may be coupled to bus $14_1$ between first initiator device $12_1$ and system interconnect 42. A dynamic timing bridge and a control element 38 may be coupled to bus $14_2$ between second initiator device $12_2$ and system interconnect 42. Additionally, dynamic timing bridges 22 shown in FIG. 2 may be coupled between initiator devices and target devices, as needed. Dynamic timing bridges 22 may receive at least one control input from a controller, for example controller 37. Controller 37 may receive an input such as a user input, an input from a PVTf sensing circuit, or any other control input.

Figure 3:
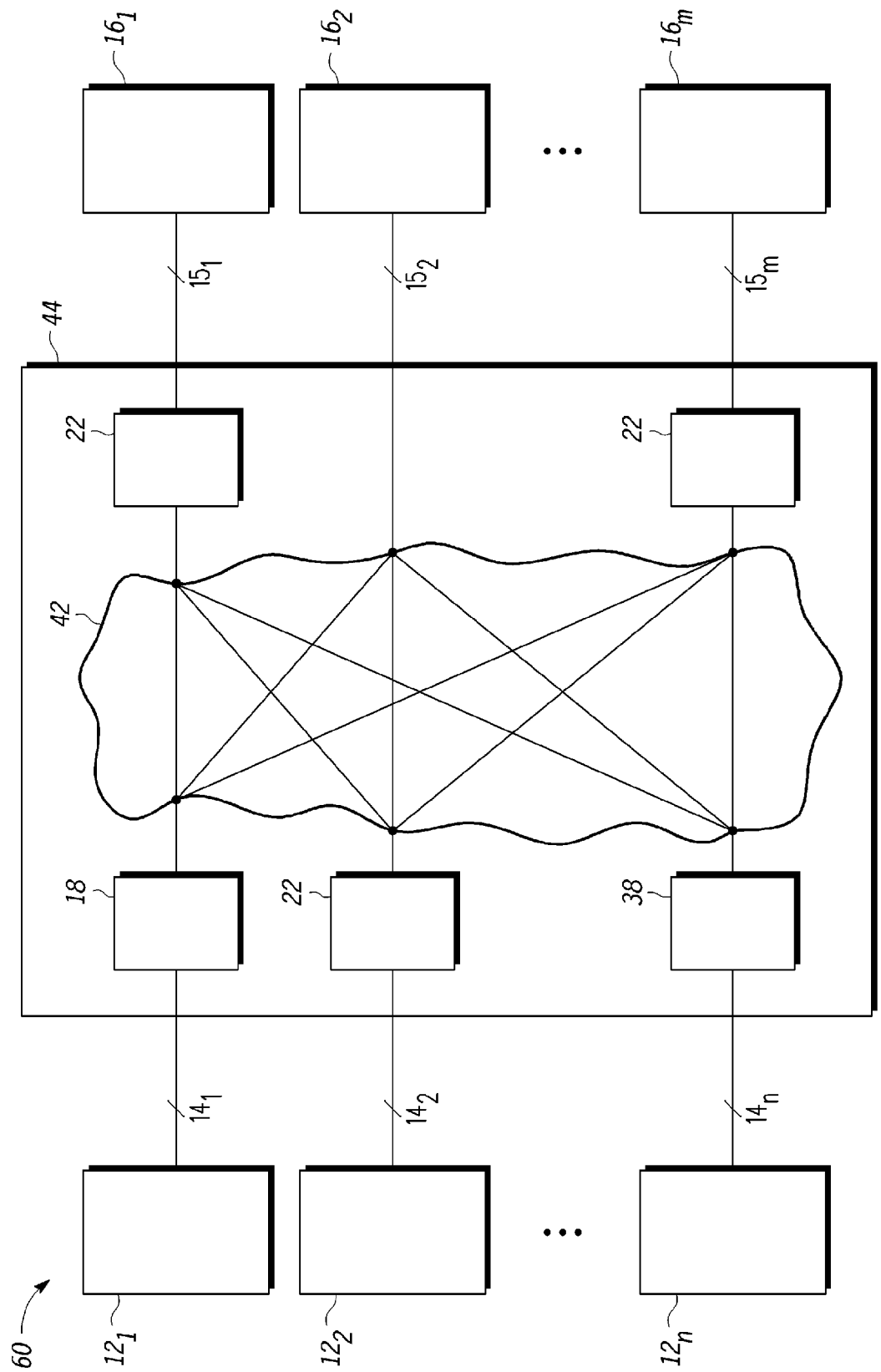
FIG. 3 shows a diagram of another exemplary data processing system having system buses with dynamic timing bridges, consistent with one embodiment of the invention.

FIG. 3 shows a diagram of another exemplary data processing system 60 having system buses with dynamic timing bridges, consistent with one embodiment of the invention. Data processing system 60 may include buses $14_1$, $14_2$, and $14_n$ connecting initiator devices $12_1$, $12_2$, and $12_n$ to a system interconnect 44. System interconnect 44 may be any combination of sequential logic and combination logic. Data processing system 60 may further include buses $15_1$, $15_2$, and $15_n$ connecting target devices $16_1$, $16_2$, and $16_n$ to system interconnect 44. Both static and dynamic timing bridges (18, 22) may be integrated within system interconnect 44, as opposed to being external to system interconnect. Although not shown in FIG. 3, dynamic timing bridges may receive at least one control input either from a control element located within system interconnect 44 or from another control element located outside system interconnect 44.

Figure 4:
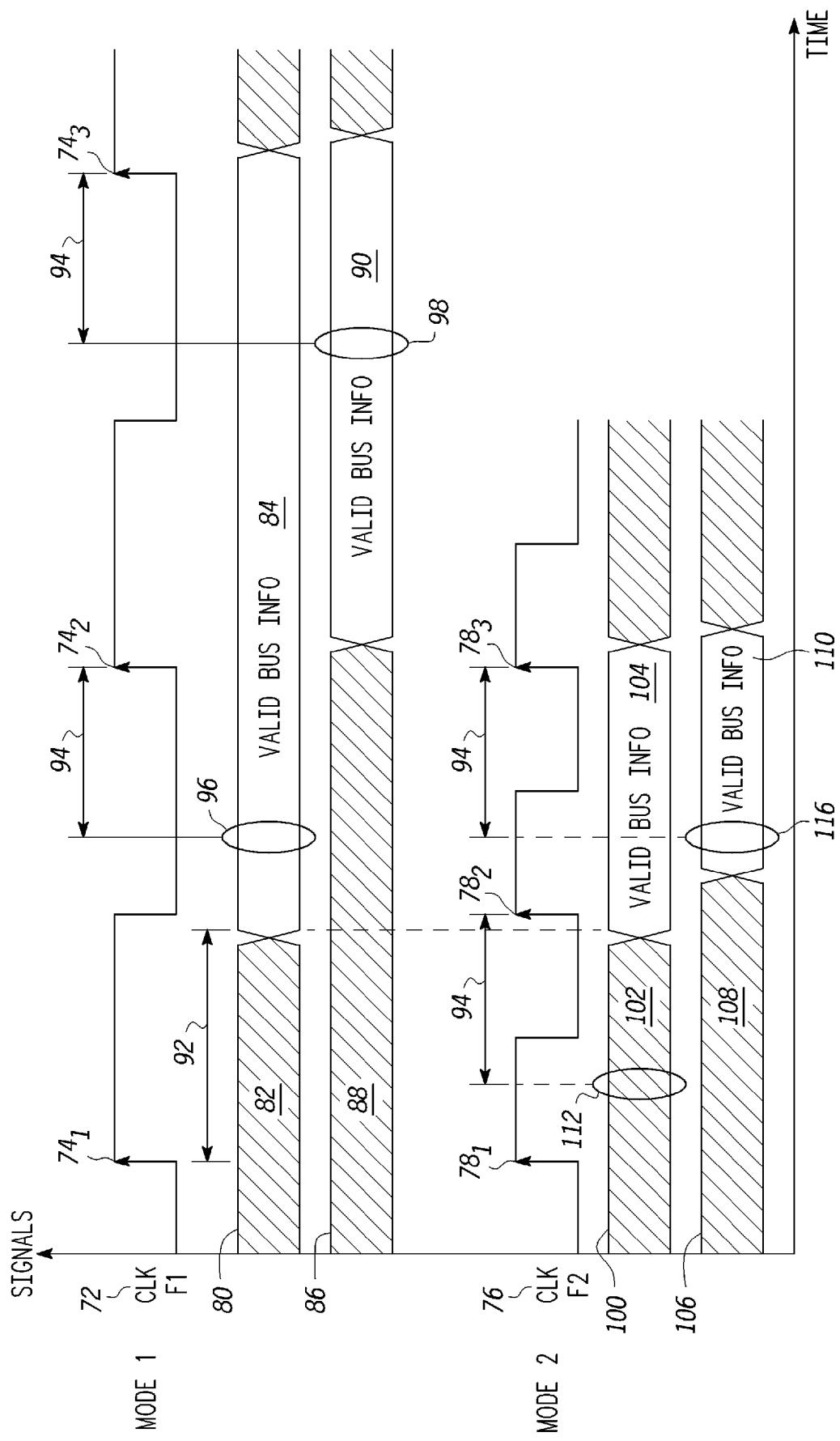
FIG. 4 shows an exemplary timing diagram for signals corresponding to the exemplary system bus of FIG. 1, consistent with one embodiment of the invention.

Referring now to FIG. 4, FIG. 4 shows an exemplary timing diagram for a system bus corresponding to exemplary data processing system 10. Although FIG. 4 shows a timing diagram with respect to data processing system 10, the timing diagram refers to the functionality of data processing systems 50 and 60, as well. In mode 1, data processing system 10 may operate under one condition while in mode 2, data processing system 10 may operate under another condition. A change from mode 1 to mode 2 may occur because of a user request, a software request, a change in clock frequency, operating voltage, operating temperature, or a change in process used to fabricate components of data processing system 10. FIG. 4 explains the operation of dynamic timing bridge 10 by using a change in clock frequency as an example. In mode 2, data processing system 10 is being clocked using a higher frequency clock CLK F2 76 compared with mode 1, where the data processing system 10 is being clocked using a lower frequency clock CLK F1 72. In mode 2, a delay of at least one clock is required to ensure sampling of valid data. For example, if data is presented on a rising edge of clock CLK F2 76 (such as edge $78_1$), then if target device 16 samples data at point 112 then it will sample invalid data. This is because as shown as by timing diagram 100 of bus 15, data at point 112 has to be present on the relevant bus for at least a minimum of setup time 94 prior to rising edge $78_2$ for it to be valid data 104 (shown as VALID BUS INFO in FIG. 4). But since data sampled at point 112 will be invalid data 102, the data processing system will function erroneously. Timing diagram 106 of bus 15 with dynamic timing bridge 22 inserting at least one cycle delay results in sampling of valid data 110 (shown as VALID BUS INFO in FIG. 4) at point 116. By way of example, dynamic timing bridge 22 may capture data present on bus 15 and then provide that data on bus 15 to target device 16. In general, since dynamic timing bridge 22 would have a relatively short setup time, it can capture data at rising edge $78_2$. Within a short time of capturing data, dynamic timing bridge 22 can then provide data on bus 15 in time for it to be sampled correctly by target device 16 at point 116, for example. Dynamic timing bridge 22 produces a control signal as part of bus 15 signals to ensure that data is captured no sooner than the minimum setup time for target device 16 prior to rising edge $78_3$ of clock CLK F2 76.

Referring still to FIG. 4, when data processing system 10 switches from mode 2 to mode 1, if sampling of data continues to be at a second rising edge, then the data processing system will suffer from unnecessary latency. In particular, as shown with reference to timing diagram 86 of bus 15, valid data 90 (shown as VALID BUS INFO in FIG. 4) will be sampled at point 98, which is at least a minimum of setup time 94 prior to the rising edge $74_3$ of clock CLK F1 72. But, by having dynamic timing bridge 22 not insert one clock cycle delay, valid data 84 (shown as VALID BUS INFO in FIG. 4) can be sampled by target device 16 at point 96, which is at least a minimum of setup time 94 prior to the rising edge $74_2$ of clock CLK F1 72. Thus, responsive to a control signal indicative of at least one system characteristic, such as a change in frequency, dynamic timing bridge 22 may insert a cyclic latency within a signaling path or it may not insert the cyclic latency. Consistent with the embodiments of the invention, and as described above, dynamic timing bridge (i) may insert the cyclic latency within the signaling path in response to conditions wherein a desired system operating frequency cannot be met in the absence of the dynamic timing bridge cyclic latency or (ii) may not insert the cyclic latency within the signaling path in response to the system operating under conditions that allow the desired system operating frequency to be met without the presence of the dynamic timing bridge cyclic latency. Dynamic timing bridge 22 thus may enable an optimal run-time system performance to be obtained across a range of one or more of process related, temperature, voltage and frequency operating conditions.

Although FIG. 4 describes the operation of dynamic timing bridge 22 with respect to a change in frequency from mode 1 to mode 2, a change in mode 1 to mode 2 may occur because of a change in any operating condition, such as a change in a voltage or temperature of the data processing system. A change in voltage or temperature may change setup time 94 and other timing constraints, such as clock to output valid time 92.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
   an initiator device having an output whose timing is referenced by a clock input alone corresponding to a first delay along a signaling path;
   a target device having an input whose timing is referenced by a clock input alone corresponding to a second delay along the signaling path;
   a system bus interconnected between the initiator device and the target device within the signaling path; and
   a dynamic timing bridge coupled to the system bus within the signaling path, wherein responsive to a control signal representative of at least one system characteristic, the dynamic timing bridge performs one selected from the group consisting of (i) inserting an at least one clock cycle delay within the signaling path and (ii) not inserting the at least one clock cycle delay within the signaling path,
   wherein the dynamic timing bridge includes a bus input, a clock input, a control signal input, and an output, and further comprises a sequential logic block and a multiplexer, and wherein (a) the bus input is coupled to (i) an input of the sequential logic block and (ii) an input of the multiplexer, (b) the clock input is coupled to a clock input of the sequential logic block, (c) an output of the sequential logic block is coupled to another input of the multiplexer, (d) the control signal input is coupled to a select input of the multiplexer, and (e) an output of the multiplexer is coupled to the output of the dynamic timing bridge, wherein responsive to the control signal input, the multiplexer multiplexes one of the bus input or the sequential logic block output onto the dynamic timing bridge output.

2. The system of claim 1, wherein the dynamic timing bridge (i) inserts the at least one clock cycle delay within the signaling path in response to conditions wherein a desired system operating frequency cannot be met in the absence of the at least one clock cycle delay and (ii) does not insert the at least one clock cycle delay within the signaling path in response to the system operating under conditions that allow the desired system operating frequency to be met without the presence of the at least one clock cycle delay.

3. The system of claim 1, wherein the dynamic timing bridge enables an optimal run-time system performance to be obtained across a range of one or more of process related, temperature, voltage and frequency operating conditions.

4. The system of claim 1, wherein the at least one system characteristic includes an operating condition based upon one or more selected from the group consisting of process, voltage, temperature, and frequency.

5. The system of claim 1, wherein the dynamic timing bridge control signal includes at least one selected from the group consisting of (i) a programmable register bit control signal, (ii) a process, voltage, temperature or frequency (PVTF) sensing circuit control signal, and (iii) other hardware control signal.

6. The system of claim 1, further comprising:
   a controller for providing the dynamic timing bridge control signal.

7. The system of claim 6, wherein the dynamic timing bridge control signal is generated by a hardware component, a software component, or a combination thereof.

8. The system of claim 1, wherein the initiator device comprises a plurality of initiator devices, the target device comprises a plurality of target devices, and the system bus comprises a plurality of system buses, the system further comprising:
a system level interconnect for interconnecting any one of the plurality of initiator devices with any one of the plurality of target devices via a corresponding one or more of the plurality of system buses including the signaling path.

9. The system of claim 8, further comprising one or more dynamic timing bridges coupled to one or more of the plurality of system buses.

10. The system of claim 9, wherein the one or more dynamic timing bridges coupled to the one or more of the plurality of system buses are disposed in one selected from the group consisting of (i) internal to the system level interconnect and (ii) external to the system level interconnect.

11. The system of claim 1, wherein the system bus comprises a distributed bus implementation.

12. A system comprising:
an initiator device having an output whose timing is referenced by a clock input alone corresponding to a first delay along a signaling path;
a target device having an input whose timing is referenced by a clock input alone corresponding to a second delay along the signaling path;
a system bus interconnected between the initiator device and the target device within the signaling path; and
a dynamic timing bridge coupled to the system bus within the signaling path, wherein responsive to a control signal representative of at least one system characteristic, the dynamic timing bridge performs one selected from the group consisting of (i) inserting an at least one clock cycle delay within the signaling path and (ii) not inserting the at least one clock cycle delay within the signaling path, wherein the dynamic timing bridge (i) inserts the at least one clock cycle delay within the signaling path in response to conditions wherein a desired system operating frequency cannot be met in the absence of the at least one clock cycle delay and (ii) does not insert the at least one clock cycle delay within the signaling path in response to the system operating under conditions that allow the desired system operating frequency to be met without the presence of the at least one clock cycle delay, and wherein the at least one system characteristic includes an operating condition based upon one or more selected from the group consisting of process, voltage, temperature, and frequency,
wherein the dynamic timing bridge includes a bus input, a clock input, a control signal input, and an output, and further comprises a sequential logic block and a multiplexer, and wherein (a) the bus input is coupled to (i) an input of the sequential logic block and (ii) an input of the multiplexer, (b) the clock input is coupled to a clock input of the sequential logic block, (c) an output of the sequential logic block is coupled to another input of the multiplexer, (d) the control signal input is coupled to a select input of the multiplexer, and (e) an output of the multiplexer is coupled to the output of the dynamic timing bridge, wherein responsive to the control signal input, the multiplexer multiplexes one of the bus input or the sequential logic block output onto the dynamic timing bridge output.

13. The system of claim 12, further comprising:
a controller for providing the dynamic timing bridge control signal.

14. The system of claim 12, wherein the initiator device comprises a plurality of initiator devices, the target device comprises a plurality of target devices, and the system bus comprises a plurality of system buses, the system further comprising:
a system level interconnect for interconnecting any one of the plurality of initiator devices with any one of the plurality of target devices via a corresponding one or more of the plurality of system buses including the signaling path.

15. A method of dynamic bypass control comprising:
providing an initiator device having an output whose timing is referenced by a clock input alone corresponding to a first delay along a signaling path;
providing a target device having an input whose timing is referenced by a clock input alone corresponding to a second delay along the signaling path;
interconnecting a system bus between the initiator device and the target device within the signaling path; and
coupling a dynamic timing bridge to the system bus within the signaling path, wherein responsive to a control signal representative of at least one system characteristic, the dynamic timing bridge performs one selected from the group consisting of (i) inserting at least one clock cycle delay within the signaling path and (ii) not inserting the at least one clock cycle delay within the signaling path, wherein the dynamic timing bridge includes a bus input, a clock input, a control signal input, and an output, and further comprises a sequential logic block and a multiplexer, and wherein (a) the bus input is coupled to (i) an input of the sequential logic block and (ii) an input of the multiplexer, (b) the clock input is coupled to a clock input of the sequential logic block, (c) an output of the sequential logic block is coupled to another input of the multiplexer, (d) the control signal input is coupled to a select input of the multiplexer, and (e) an output of the multiplexer is coupled to the output of the dynamic timing bridge, wherein responsive to the control signal input, the multiplexer multiplexes one of the bus input or the sequential logic block output onto the dynamic timing bridge output.

16. The method of claim 15, wherein the dynamic timing bridge (i) inserts the at least one clock cycle delay within the signaling path in response to conditions wherein a desired system operating frequency cannot be met in the absence of the at least one clock cycle delay and (ii) does not insert the at least one clock cycle delay within the signaling path in response to the system operating under conditions that allow the desired system operating frequency to be met without the presence of the at least one clock cycle delay.

17. The method of claim 15, wherein the dynamic timing bridge enables an optimal run-time system performance to be obtained across a range of one or more of process related, temperature, voltage and frequency operating conditions.

18. The method of claim 15, wherein the at least one system characteristic includes an operating condition based upon one or more selected from the group consisting of process, voltage, temperature, and frequency.

* * * * *